United States Patent
Loew (10) Patent No.: US 12,446,568 B2
(45) Date of Patent: Oct. 21, 2025

(54) SIMULATED SNAKE HOSE DEVICE

(71) Applicant: Adam Loew, Tawas City, MI (US)

(72) Inventor: Adam Loew, Tawas City, MI (US)

( * ) Notice: Subject to any disclaimer, the term of this patent is extended or adjusted under 35 U.S.C. 154(b) by 101 days.

(21) Appl. No.: 18/302,536

(22) Filed: Apr. 18, 2023

(65) Prior Publication Data

US 2023/0345930 A1  Nov. 2, 2023

Related U.S. Application Data (60) Provisional application No. 63/335,529, filed on Apr. 27, 2022.

(51) Int. Cl.
 *A01M 29/06* (2011.01)

(52) U.S. Cl.
 CPC .................... *A01M 29/06* (2013.01)

(58) Field of Classification Search
 CPC ............... A01M 29/06; A63H 29/14
 USPC ................. 446/368; D23/266, 213
 See application file for complete search history.

(56) References Cited

U.S. PATENT DOCUMENTS

| | | | | |
|---|---|---|---|---|
| 1,631,849 A | * | 6/1927 | Arnt ...................... | B05B 15/625 248/82 |
| 3,079,727 A | * | 3/1963 | Melin ..................... | A63H 29/14 D21/465 |
| 3,473,770 A | * | 10/1969 | Edgerton .............. | B05B 15/622 24/351 |
| D428,964 S | * | 8/2000 | King ........................... | D23/266 |
| D469,520 S | * | 1/2003 | McLean ..................... | D23/266 |
| 2002/0068502 A1 | * | 6/2002 | Kownacki .............. | A63H 17/00 446/176 |
| 2003/0038478 A1 | * | 2/2003 | Humphreys .......... | F16L 33/227 285/239 |
| 2007/0045907 A1 | * | 3/2007 | Salatino ................ | B29C 33/424 264/573 |
| 2009/0092646 A1 | * | 4/2009 | Dunham ................ | A01N 25/34 424/405 |
| 2013/0133772 A1 | * | 5/2013 | Lorraine ................ | F16L 35/00 138/110 |
| 2019/0183108 A1 | * | 6/2019 | Slevens ................. | A01M 29/06 |
| 2020/0068820 A1 | * | 3/2020 | Kohavi ................ | A01G 25/026 |

\* cited by examiner

*Primary Examiner* — Christopher D Hutchens (74) *Attorney, Agent, or Firm* — Brennan, Manna & Diamond, LLC (57) ABSTRACT

The present invention relates to a novel simulated snake hose device. The device is designed to protect gardens without the need for fencing. The device comprises a no-kink hose with a wrench collar and a hex head brass fitting. Further, a simulated snake head is secured onto the hose end and supported by a folding stake to keep the snake head above the grass. The hose is also printed with a snakeskin pattern to simulate differing snake species and patterns.

10 Claims, 4 Drawing Sheets

SIMULATED SNAKE HOSE DEVICE

CROSS-REFERENCE TO RELATED APPLICATION

The present application claims priority to, and the benefit of, U.S. Provisional Application No. 63/335,529, which was filed on Apr. 27, 2022 and is incorporated herein by reference in its entirety.

FIELD OF THE INVENTION

The present invention relates generally to the field of simulated snake hose devices. More specifically, the present invention relates to a simulated snake head that is secured onto a hose end and supported by a folding stake to keep the snake head above the grass. The hose is also printed with a snakeskin pattern to simulate differing snake species and patterns. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in garden hoses of the type which are used to water vegetable gardens and flower beds. Typically, many users have home gardens, either vegetable and/or flower gardens. However, small pests like rabbits, squirrels, chipmunks, voles, etc., can often get into, eat and destroy the garden. In order to prevent this damage from occurring, garden owners may have to erect unappealing garden fences. These fences can be costly and difficult to maintain.

Thus, it is necessary for users with vegetable and/or flower gardens, as well as small scale farmers, to have a means for keeping plant-eating pests out of their garden in a natural way. Rabbits, mice, voles, and other plant-eating pests can devour a garden well before a user can harvest the ripe vegetables. Thus, a natural means of warding off small pest and/or animals from a garden is needed.

Therefore, there exists a long-felt need in the art for a simulated snake hose device that provides users with a garden hose that simulates a snake. There is also a long-felt need in the art for a simulated snake hose device that protects gardens without the need for fencing. Further, there is a long-felt need in the art for a simulated snake hose device that protects gardens by scaring away small pest animals. Moreover, there is a long-felt need in the art for a device that protects gardens by scaring away small pest animals, while also providing additional garden utility. Further, there is a long-felt need in the art for a simulated snake hose device that can be left in the garden to water the garden while also giving the appearance of a predator to ward off small pest animals. Finally, there is a long-felt need in the art for a simulated snake hose device that prevents users from having to erect unappealing garden fences to keep out small pests.

The subject matter disclosed and claimed herein, in one embodiment thereof, comprises a simulated snake hose device. The device is designed to protect gardens without the need for fencing. The device comprises a no-kink hose with a wrench collar and a hex head brass fitting. Further, a simulated snake head is secured onto the hose end and supported by a folding stake to keep the snake head above the grass. The hose is also printed with a snakeskin pattern to simulate differing snake species and patterns.

In this manner, the simulated snake hose device of the present invention accomplishes all of the foregoing objectives and provides a device that prevents users from having to erect unappealing garden fences to keep out small pests. The device allows a user to protect a garden without the need for fencing. The device protects gardens by scaring away small pests while also providing additional garden utility.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a simulated snake hose device. The device is designed to protect gardens without the need for fencing. The device comprises a no-kink hose with a wrench collar and a hex head brass fitting. Further, a simulated snake head is secured onto the hose end and supported by a folding stake to keep the snake head above the grass. The hose is also printed with a snakeskin pattern to simulate differing snake species and patterns.

In one embodiment, the no-kink hose of the present invention comprises a fluid conveying tube of cylindrical shape, with an end fitting attached to each opposing end of the tube. The end fittings allow connection to a fluid source, such as a water supply, spigot, faucet, etc., or other water source as is known in the art, in a threaded detachable fashion. The end fittings also allow connection to a fluid control device, such as a nozzle or other fluid flow regulating device, in a threaded detachable fashion. Further, the tube has an inner surface and an outer surface.

In another embodiment, the end fitting is a hex head fitting with an inner component and an outer component, wherein the inner component is secured within the hose and the outer component is secured outside the hose. The outer component and the inner component are both preferably machined but can be manufactured using any other suitable method as is known in the art. Typically, the machined outer and inner components contain threads that mate with various nozzles, sprinklers, faucets, or other attachments as is known in the art. Additionally, the hex head fitting allows the hose to be threaded onto a standard hose end and thus, used with an existing hose. The machined outer and inner components can be machined from brass, aluminum, stainless steel, or other corrosion resistant materials. The machined outer and inner components can use different designs for aesthetic or functional benefit.

In one embodiment, the no-kink hose of the present invention comprises a flexible material to allow for flexibility, such that the hose does not kink and stop water flow when the hose is bent. Specifically, the hose of the present invention can be constructed as a standard hose as known to those of ordinary skill in the art, with an increased wall thickness and high-grade materials. For example, the no-kink hose is typically polymeric in nature and can be formed from one or more of various polymers; elastomers; and rubbers, including natural rubber, synthetic rubber, and combinations thereof. The hose can have one or more reinforcing layers or portions formed from a fabric and/or various fibers as known in the art. The hose compositions of the present invention may also comprise additional additives including, but not limited to, antioxidants, foaming agents, pigments, heat stabilizers, UV absorbers/stabilizers, processing aids, flow enhancing agents, nanoparticles, and various fillers. Further, the hose is manufactured from a material that is water resistant.

Generally, the hose can be formed having any desired internal diameter, such as 0.5 inch (1.27 cm) or 0.75 inch (1.91 cm), and can be manufactured having any desired length, depending on the needs and/or wants of a user. Further, when utilized herein, the term "wall thickness" refers to a thickness of a construction, such as for the sleeve, tube, or hose, measured in a radial direction, unless otherwise specified.

In another embodiment, the body of the hose is printed with a snakeskin pattern, which includes any snake species as is known in the art, or other reptile species and/or other suitable patterns. Specifically, the hose body features an ultra-realistic printed snakeskin pattern. The hose can be manufactured in multiple patterns and options for the printed snakeskin. Any suitable snake species as is known in the art can be utilized on the hose body to mimic all snake species known in the art.

In another embodiment, the simulated snake hose device comprises a simulated snake head which is slid along the hose body and secured via compression fit, or threads once in position on the hose body. The simulated snake head comprises the head of any suitable snake as is known in the art, along with a portion of the snake's body which overlays a portion of the hose body. The snake head and body portion are printed in an ultra-realistic snake pattern to resemble a real snake and blend in with the hose body. Thus, the hose and simulated snake head give the appearance of a real snake to ward off small pests and other animals.

Further, once in place, the simulated snake head is further secured in place on the hose body via a folding stake, or other suitable securing means. The folding stake is then placed into the ground, such that the snake head is positioned above the grass and is visible to small pests. Specifically, the folding stake comprises a ground stake component which is inserted into the ground and a C-shaped cradle or receiver component which accepts the snake head and hose body and retains them within the receiver component. The folding stake keeps the simulated snake head visible above the grass. Thus, the hose body and the simulated snake head are designed to look like a snake lying in wait, such that a user can utilize natural predator power to scare off pests and small animals to protect their garden.

In one embodiment, the snake head can also be used as a handle when using the hose for watering. A user can easily grasp the simulated snake head when utilizing the hose. Thus, a user can grasp the simulated snake head to water the garden, while the hose also gives the appearance of a predator to ward off pests and small animals.

In another embodiment, the hose comprises a sleeve or wrench collar which is fixedly secured to at least one end of the hose body, in order to provide strain relief to the portion of the hose body that the sleeve or wrench collar surrounds and reduce the ability of the hose to kink in the area adjacent to the end fitting.

Further, the wrench collar comprises a first end and a second end, with the first end preferably being aligned with the first end of the hose body, perpendicular to the longitudinal axis of the hose. The wrench collar has an inner diameter that is preferably cylindrical and equal to or greater than the outer diameter of the hose body in order to allow the wrench collar to be positioned over a first end portion of the hose body. Specifically, the inner diameter of the wrench collar is in contact with the outer surface of the hose body along the longitudinal length of the wrench collar.

The longitudinal length of the wrench collar can vary depending upon the strain relieving characteristics desired to be imparted to the hose. In various embodiments, the wrench collar has a length that ranges from about 5 to about 25 cm, preferably from about 10 to about 20 cm and more preferably from about 15.2 cm.

The wrench collar, according to the present invention, is formed from a polymer. Any suitable polymer that provides the desirable flexibility and strain relief properties can be utilized including, but not limited to, thermoplastic elastomers, including thermoplastic vulcanizates, polyolefins, polyvinyl chloride, polyamides, polyesters, polyurethanes, or polyvinyl chloride, etc. Further, suitable thermoplastic elastomers include, but are not limited to, styrenic block copolymers, such as SEBS, SEEPS, SBS and SIS, etc. Additionally, the wrench collar can be produced utilizing various methods including, but not limited to, molding, extruding, and dip molding, etc.

In yet another embodiment, the simulated snake hose device comprises a plurality of indicia.

In yet another embodiment, a method of protecting a garden without the need for fencing is described. The method includes the steps of providing a simulated snake hose device comprising a hose with a snakeskin pattern and a simulated snake head. The method also comprises positioning the simulated snake head on the hose. Further, the method comprises positioning the hose and simulated snake head in the folding stake, then placing the folding stake in the ground, such that the simulated snake head stays above the grass. Finally, utilizing the simulated snake hose device to water a garden to scare away small pests.

In yet another embodiment of the present invention, the simulated snake hose device comprises a hose body printed with a snakeskin pattern and a simulated snake head. The simulated snake head is slid along the hose body and supported by folding the stake to be visible above the grass. Thus, the hose can be left in the garden to water the garden while also giving the appearance of a predator to ward off small pests and/or animals. Further, the simulated snake hose device can be comprised of different snake species and patterns as is known in the art.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a simulated snake hose device that provides users with a garden hose that simulates a snake. There is also a long-felt need in the art for a simulated snake hose device that protects gardens without the need for fencing. Further, there is a long-felt need in the art for a simulated snake hose device that protects gardens by scaring away small pest animals. Moreover, there is a long-felt need in the art for a device that protects gardens by scaring away small pest animals while also providing additional garden utility. Further, there is a long-felt need in the art for a simulated snake hose device that can be left in the garden to water the garden while also giving the appearance of a predator to ward off small pest animals. Finally, there is a long-felt need in the art for a simulated snake hose device that prevents users from having to erect unappealing garden fences to keep out small pests.

The present invention, in one exemplary embodiment, is a novel simulated snake hose device. The device is designed to protect gardens without the need for fencing. The device comprises a no-kink hose with a wrench collar and a hex head brass fitting. Further, a simulated snake head is secured onto the hose end and supported by a folding stake to keep the snake head above the grass. The hose is also printed with a snakeskin pattern to simulate differing snake species and patterns. The present invention also includes a novel method of protecting a garden without the need for fencing. The method includes the steps of providing a simulated snake hose device comprising a hose with a snakeskin pattern and a simulated snake head. The method also comprises positioning the simulated snake head on the hose. Further, the method comprises positioning the hose and simulated snake head in the folding stake, then placing the folding stake in the ground, such that the simulated snake head stays above the grass. Finally, utilizing the simulated snake hose device to water a garden and scare away small pests.

Referring initially to the drawings, FIGS. 1A-D illustrate a perspective view of one embodiment of the simulated snake hose device 100 of the present invention. In the present embodiment, the simulated snake hose device 100 is an improved hose device that protects gardens by scaring away small pests. The device 100 is especially designed to allow users of home vegetable and/or flower gardens, users of small-scale farms, etc., or any other suitable user as is known in the art, to both water a garden and scare away small pests. More specifically, the device 100 comprises a snakeskin patterned hose 102 with a simulated snake head 104 secured to it. The simulated snake hose device 100 thus gives the appearance of a predator and can be left in a garden to water the garden while also warding off small pests and other animals.

Furthermore, the no-kink hose 102 of the present invention comprises a fluid conveying tube 106 of cylindrical shape or any other suitable shape as is known in the art depending on the needs and/or wants of a user. The hose 102 also comprises an end fitting 108 attached to each opposing end 110 of the tube 106. The end fittings 108 allow connection to a fluid source (not shown), such as a water supply, spigot, faucet, etc., or other water source as is known in the art, in a threaded detachable fashion. The end fittings 108 also allow connection to a fluid control device (not shown), such as a nozzle or other fluid flow regulating device, in a threaded detachable fashion. Further, the tube 106 has an inner surface 112 and an outer surface 114.

In one embodiment, the end fitting 108 is a hex head fitting 116 with an inner component 118 and an outer component 120, wherein the inner component 118 is secured within the hose 102 and the outer component 120 is secured outside the hose 102. The outer component 120 and the inner component 118 are both preferably machined but can be manufactured using any other suitable methods as is known in the art. Typically, the machined outer 120 and inner 118 components contain threads 122 that mate with various nozzles, sprinklers, faucets, or other attachments as is known in the art (not shown). Additionally, the hex head fitting 116 allows the hose 102 to be threaded onto a standard hose end and thus, used with an existing hose. The machined outer 120 and inner 118 components can be machined from brass, aluminum, stainless steel, or other corrosion resistant materials. The machined outer 120 and inner 118 components can use different designs for aesthetic or functional benefit.

In one embodiment, the no-kink hose 102 of the present invention comprises a flexible material to allow for flexibility, such that the hose 102 does not kink and stop water flow when the hose 102 is bent. Specifically, the hose 102 of the present invention can be constructed as a standard hose as known to those of ordinary skill in the art, with an increased wall thickness and high-grade materials. For example, the no-kink hose 102 is typically polymeric in nature and can be formed from one or more of various polymers; elastomers; and rubbers, including natural rubber, synthetic rubber, and combinations thereof. The hose 102 can have one or more reinforcing layers or portions formed from a fabric and/or various fibers as known in the art. The hose 102 compositions of the present invention may also comprise additional additives including, but not limited to, antioxidants, foaming agents, pigments, heat stabilizers, UV absorbers/stabilizers, processing aids, flow enhancing agents, nanoparticles, and various fillers. Generally, the simulated snake hose device 100 is also manufactured from a material that is water resistant or water permeable, or the hose 102 comprises a coating that is water resistant or water permeable.

Generally, the hose 102 can be formed having any desired internal diameter, such as 0.5 inch (1.27 cm) or 0.75 inch (1.91 cm), and can be manufactured having any desired length, depending on the needs and/or wants of a user. Further, when utilized herein, the term "wall thickness" refers to a thickness of a construction, such as for the wrench collar, tube, or hose, measured in a radial direction, unless otherwise specified.

Figure 1A:
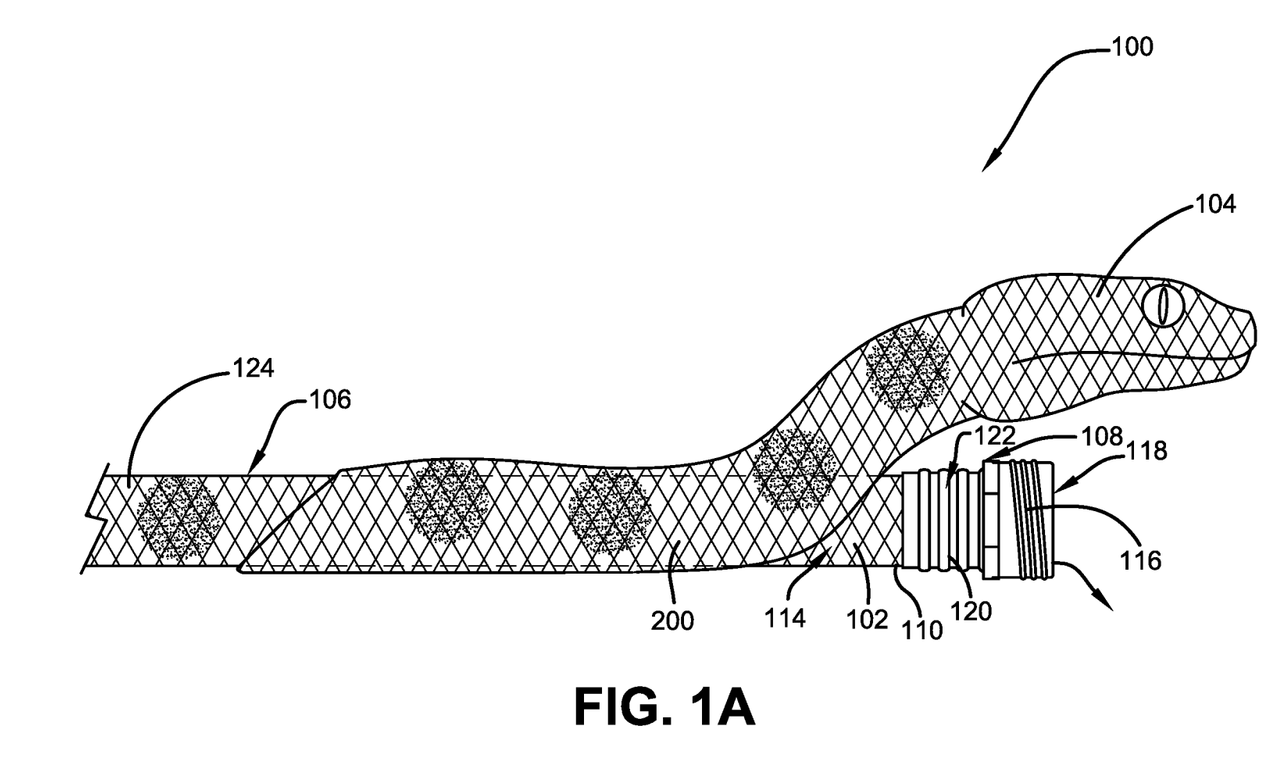
FIG. 1A illustrates a perspective view of one embodiment of the simulated snake hose device of the present invention in accordance with the disclosed architecture.
Figure 1B:
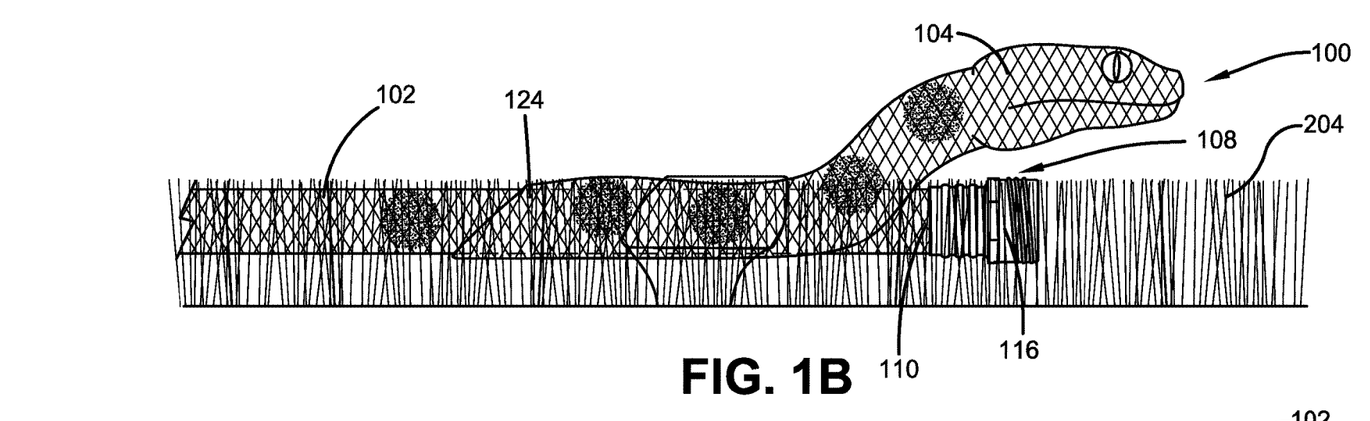
FIG. 1B illustrates a perspective view of one embodiment of the simulated snake hose device of the present invention with the snake head above the grass in accordance with the disclosed architecture.
Figures 1C, 1D:
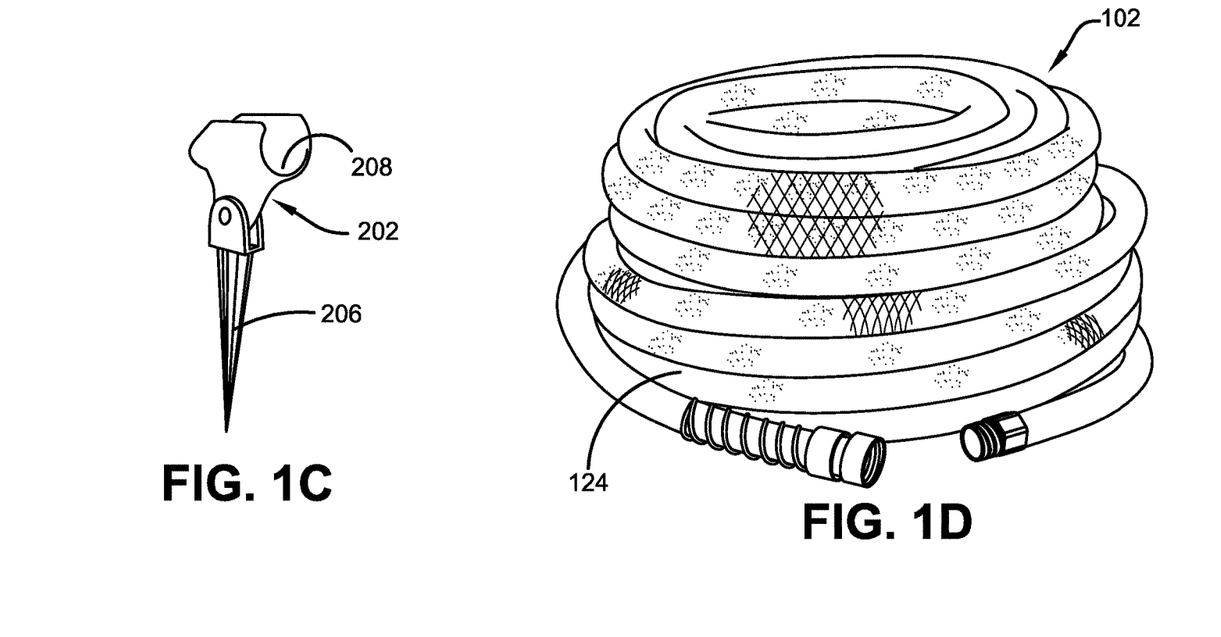
FIG. 1C illustrates a perspective view of one embodiment of the folding stake of the simulated snake hose device of the present invention in accordance with the disclosed architecture.
FIG. 1D illustrates a perspective view of one embodiment of the hose printed with a snakeskin pattern of the simulated snake hose device of the present invention in accordance with the disclosed architecture.

In another embodiment, the body of the hose 102 is printed with a snakeskin pattern 124, which includes any snake species as is known in the art, or any other reptile species and/or other suitable patterns. Specifically, the hose body 102 features an ultra-realistic printed snakeskin pattern 124. The hose 102 can be manufactured in multiple patterns and options for the printed snakeskin 124. Any suitable snake species as is known in the art can be utilized on the hose body 102 to mimic all snake species known in the art.

Figure 2A:
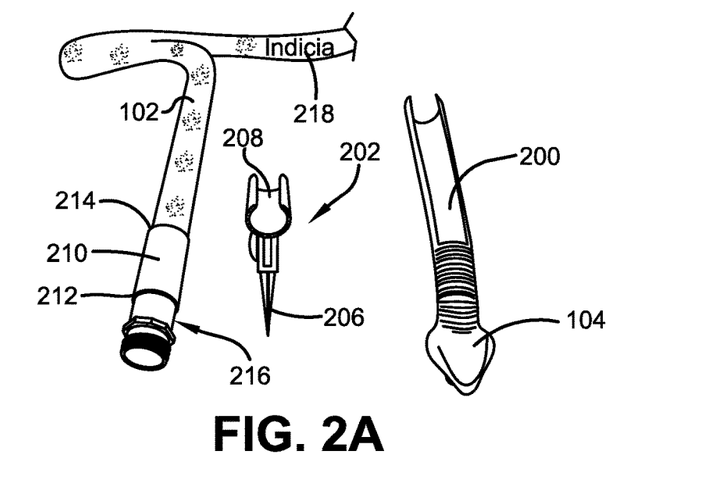
FIG. 2A illustrates a perspective view of one embodiment of the components of the simulated snake hose device of the present invention in accordance with the disclosed architecture.
Figure 2B:
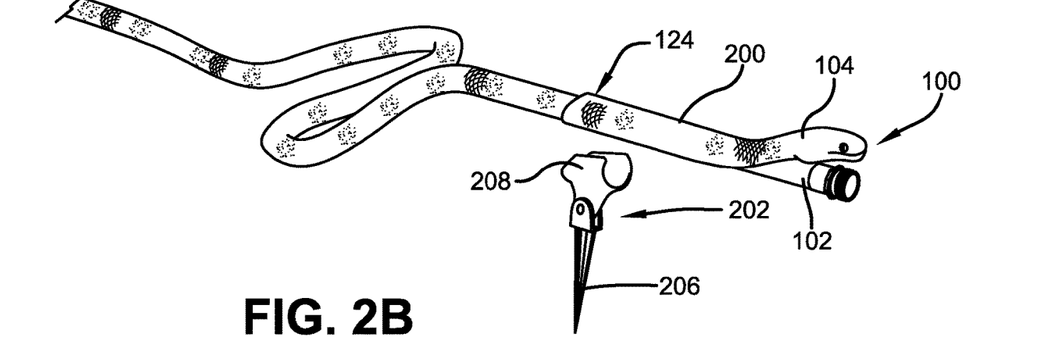
FIG. 2B illustrates a perspective view of one embodiment of how the folding stake attaches to the simulated snake hose device of the present invention in accordance with the disclosed architecture.
Figure 2C:
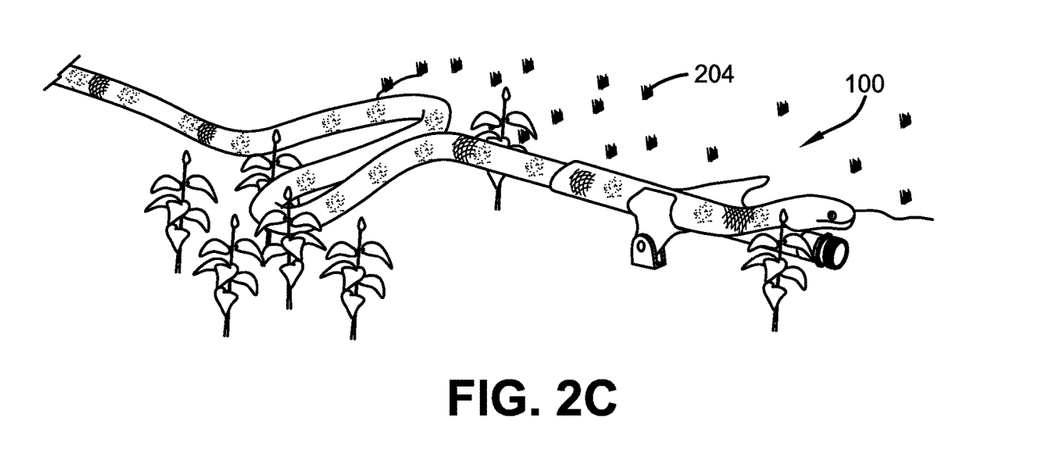
FIG. 2C illustrates a perspective view of one embodiment of the simulated snake hose device of the present invention in use in accordance with the disclosed architecture.

As shown in FIGS. 2A-C, the simulated snake hose device 100 comprises a simulated snake head 104 which is slid along the hose body 102 and secured via compression fit or threads once in position on the hose body 102. The simulated snake head 104 comprises the head of any suitable snake as is known in the art, along with a portion of the snake's body 200 which overlays a portion of the hose body 102. The snake head 104 and body portion 200 are printed in an ultra-realistic snake pattern 124 to resemble a real snake and blend in with the hose body 102. Thus, the hose 102 and simulated snake head 104 give the appearance of a real snake to ward off small pests and other animals.

Further, once in place, the simulated snake head 104 is further secured in place on the hose body 102 via a folding stake 202, or other suitable securing means. The folding stake 202 is then placed into the ground, such that the snake head 104 is positioned above the grass 204 and is visible to small pests. Specifically, the folding stake 202 comprises a ground stake component 206 which is inserted into the ground and a C-shaped cradle or receiver component 208 which accepts the snake head 104 and hose body 102 and retains them within the receiver component 208. The folding stake 202 keeps the simulated snake head 104 visible above the grass 204. Thus, the hose body 102 and the simulated snake head 104 is designed to look like a snake lying in wait, such that a user can utilize natural predator power to scare off pests and small animals to protect their garden.

In one embodiment, the snake head 104 can also be used as a handle when using the hose 102 for watering. A user can easily grasp the simulated snake head 104 when utilizing the hose 102. Thus, a user can grasp the simulated snake head 104 to water the garden, while the hose 102 also gives the appearance of a predator to ward off pests and small animals.

In another embodiment, the hose 102 comprises a sleeve or wrench collar 210 which is fixedly secured to at least one end of the hose body 102, in order to provide strain relief to the portion of the hose body 102 that the sleeve or wrench collar 210 surrounds and reduces the ability of the hose 102 to kink in the area adjacent to the end fitting 108.

Further, the wrench collar 210 comprises a first end 212 and a second end 214, with the first end 212 preferably being aligned with the first end 216 of the hose body 102, perpendicular to the longitudinal axis of the hose 102. The wrench collar 210 has an inner diameter that is preferably cylindrical and equal to or greater than the outer diameter of the hose body 102 in order to allow the wrench collar 210 to be positioned over a first end portion 216 of the hose body 102. Specifically, the inner diameter of the wrench collar 210 is in contact with the outer surface 114 of the hose body 102 along the longitudinal length of the wrench collar 210.

The longitudinal length of the wrench collar 210 can vary depending upon the strain relieving characteristics desired to be imparted to the hose 102. In various embodiments, the wrench collar 210 has a length that ranges from about 5 to about 25 cm, preferably from about 10 to about 20 cm and more preferably from about 15.2 cm.

The wrench collar 210, according to the present invention, is formed from a polymer. Any suitable polymer that provides the desirable flexibility and strain relief properties can be utilized including, but not limited to, thermoplastic elastomers, including thermoplastic vulcanizates, polyolefins, polyvinyl chloride, polyamides, polyesters, polyurethanes, or polyvinyl chloride, etc. Further, suitable thermoplastic elastomers include, but are not limited to, styrenic block copolymers, such as SEBS, SEEPS, SBS and SIS, etc. Additionally, the wrench collar 210 can be produced utilizing various methods including, but not limited to, molding, extruding, and dip molding, etc.

In yet another embodiment, the simulated snake hose device 100 comprises a plurality of indicia 218. The hose 102 of the device 100 may include advertising, a trademark, or other letters, designs, or characters, printed, painted, stamped, or integrated into the hose 102, or any other indicia 218 as is known in the art. Specifically, any suitable indicia 218 as is known in the art can be included, such as, but not limited to, patterns, logos, emblems, images, symbols, designs, letters, words, characters, animals, advertisements, brands, etc., that may or may not be garden or brand related.

Figure 3:
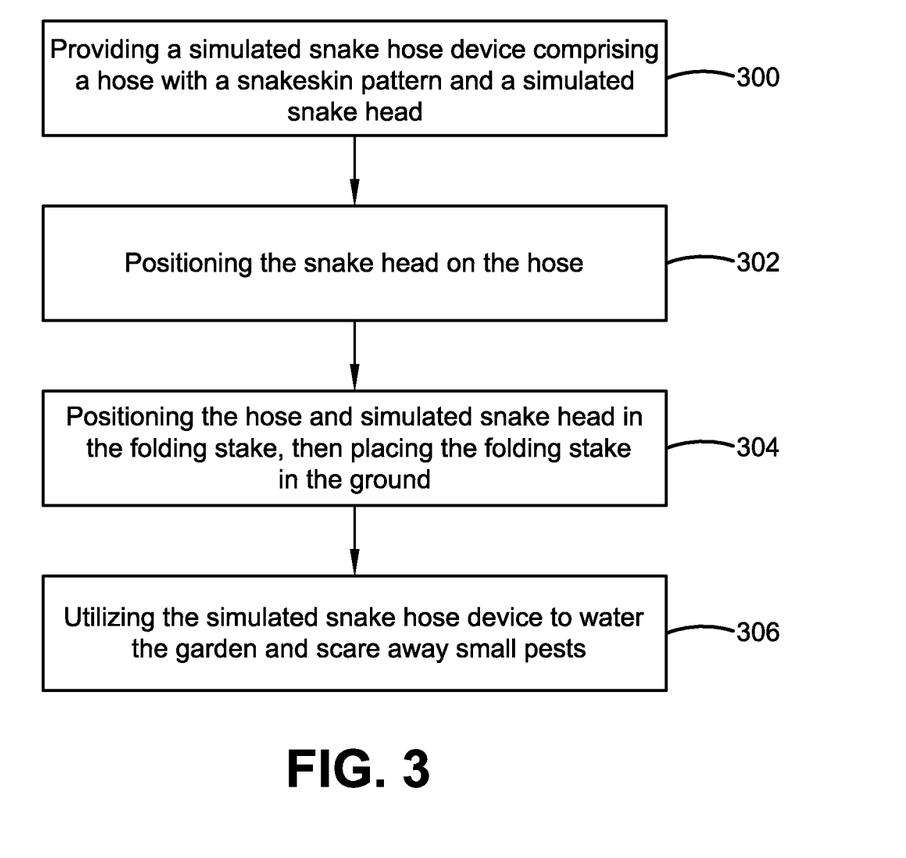
FIG. 3 illustrates a flowchart showing the method of protecting a garden without the need for fencing in accordance with the disclosed architecture.

FIG. 3 illustrates a flowchart of the method of protecting a garden without the need for fencing. The method includes the steps of at 300, providing a simulated snake hose device comprising a hose with a snakeskin pattern and a simulated snake head. The method also comprises at 302, positioning the simulated snake head on the hose. Further, the method comprises at 304, positioning the hose and simulated snake head in the folding stake, then placing the folding stake in the ground, such that the simulated snake head stays above the grass. Finally, at 306, utilizing the simulated snake hose device to water a garden and scare away small pests.

In yet another embodiment of the present invention, the simulated snake hose device 100 comprises a hose body 102 printed with a snakeskin pattern 124 and a simulated snake head 104. The simulated snake head 104 is slid along the hose body 102 and supported by folding the stake 202 to be visible above the grass 204. Thus, the hose 102 can be left in the garden to water the garden while also giving the appearance of a predator to ward off small pests and/or animals. Further, the simulated snake hose device 100 can be comprised of different snake species and patterns as is known in the art.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "simulated snake hose device" and "device" are interchangeable and refer to the simulated snake hose device 100 of the present invention.

Notwithstanding the foregoing, the simulated snake hose device 100 of the present invention can be of any suitable size and configuration as is known in the art without affecting the overall concept of the invention, provided that it accomplishes the above-stated objectives. One of ordinary skill in the art will appreciate that the simulated snake hose device 100 as shown in FIGS. 1-3 are for illustrative purposes only, and that many other sizes and shapes of the simulated snake hose device 100 are well within the scope of the present disclosure. Although the dimensions of the simulated snake hose device 100 are important design parameters for user convenience, the simulated snake hose device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A simulated snake hose device for protecting gardens by scaring away small pests comprising:
    a hose; and
    a simulated snake head secured to the hose, wherein the simulated snake head and the hose give the appearance of a presence of a predator and can be left in a garden to water the garden while also warding off a pest or other animal; and
    wherein the hose comprises a fluid conveying tube with an end fitting attached to each opposing end of the fluid conveying tube;
    wherein the end fitting is secured to the fluid conveying tube via a plurality of threads;
    wherein the end fitting is a hex head fitting;
    wherein the hex head fitting comprises an inner component secured within the hose and an outer component secured on an outside of the hose;
    wherein a body of the hose is printed with a snakeskin pattern;
    wherein the simulated snake head is repositionable along the hose and secured thereto via a compression fit or a plurality of threads;
    wherein the simulated snake head comprises a head of any suitable snake along with a portion of a snake's body; and
    wherein the simulated snake head is secured in place on the hose via a folding stake.

2. The simulated snake hose device of claim 1, wherein the folding stake comprises a ground stake component inserted into a ground and a receiver component is sized and configured to accept the simulated snake head.

3. The simulated snake hose device of claim 2, wherein the simulated snake head is used as a handle when using the hose.

4. The simulated snake hose device of claim 3, wherein the hose comprises a wrench collar that is fixedly secured to at least one end of the hose to provide a strain relief to the hose.

5. A simulated snake hose device for protecting a garden comprising:
    a hose comprising a fluid conveying tube with a hex head fitting attached to a pair of opposing ends of the fluid conveying tube; and
    a simulated snake head;
    wherein the simulated snake head is repositionable along the hose and secured thereto via a compression fit or a plurality of threads;
    wherein a body of the hose is printed with a snakeskin pattern, which includes any suitable snake species;
    wherein the simulated snake head and hose gives an appearance of a presence of a predator and can be left in the garden to water the garden while also warding off a pest or other animal;
    wherein the simulated snake head comprises a head of any suitable snake along with a portion of a snake's body; and
    wherein the simulated snake head is secured in place on the hose via a folding stake.

6. The simulated snake hose device of claim 5, wherein the folding stake comprises a ground stake component inserted into a ground and a receiver component that is sized and configured to receive the simulated snake head.

7. The simulated snake hose device of claim 6, wherein the simulated snake head is used as a handle when using the hose.

8. The simulated snake hose device of claim 5, wherein the hose comprises a wrench collar that is fixedly secured to at least one of the pair of opposing ends to provide a strain relief to the hose.

9. The simulated snake hose device of claim 5 further comprising a plurality of indicia.

10. A method of protecting a garden comprising the steps of:
    providing a simulated snake hose device comprising a hose with a snakeskin pattern and a simulated snake head;
    positioning the simulated snake head on the hose;
    positioning the hose and simulated snake head in a folding stake, then placing the folding stake in the ground, such that the simulated snake head stays above a patch of grass; and utilizing the simulated snake hose device to water a garden and scare away small pests.

* * * * *